US008678735B2

(12) United States Patent
Greeb

(10) Patent No.: US 8,678,735 B2
(45) Date of Patent: Mar. 25, 2014

(54) BULK GOODS DOSING DEVICE

(75) Inventor: Herbert Greeb, Dillenburg (DE)

(73) Assignee: Linde AG, Munich (DE)

( * ) Notice: Subject to any disclaimer, the term of this patent is extended or adjusted under 35 U.S.C. 154(b) by 291 days.

(21) Appl. No.: 13/073,072

(22) Filed: Mar. 28, 2011

(65) Prior Publication Data

US 2011/0236166 A1    Sep. 29, 2011

(30) Foreign Application Priority Data

Mar. 29, 2010    (EP) .................................... 10003341

(51) Int. Cl.
*A01F 25/18*    (2006.01)
*A01F 25/20*    (2006.01)

(52) U.S. Cl.
USPC .......................................... 414/307; 414/312

(58) Field of Classification Search
CPC ....... B01J 8/002; B65B 37/10; B65G 65/466;
C10B 31/02; C10B 31/04; C10J 3/30; C10J 3/32; C21B 7/20; F23K 3/00; F23K 3/06; F23K 3/14; F23K 3/16; F23K 3/18; F27B 1/20; F27D 3/10
USPC ......... 414/158, 174, 175, 197, 199, 200, 301, 414/306, 195; 222/216, 408.5, 623, 459
See application file for complete search history.

(56) References Cited

U.S. PATENT DOCUMENTS 3,765,547 A *   10/1973   Shivvers .................... 366/131
3,896,943 A *   7/1975   Knutsen .................... 414/307
4,197,092 A *   4/1980   Bretz ........................... 48/86 R
4,946,078 A *   8/1990   Heep et al. .................... 222/368
6,726,430 B1 *   4/2004   Donelson ..................... 414/301

FOREIGN PATENT DOCUMENTS

| CH | 355403 A | 6/1961 |
|---|---|---|
| DE | 43 35 949 A1 | 5/1994 |
| DE | 102 61 395 A1 | 7/2004 |
| JP | 55-140430 A | 11/1980 |

OTHER PUBLICATIONS

European Search Report, Application No. EP 10003341, Oct. 4, 2010, 1 pg.

* cited by examiner

*Primary Examiner* — Saul Rodriguez
*Assistant Examiner* — Brendan Tighe
(74) *Attorney, Agent, or Firm* — Paul D. Strain, Esq.; Strain & Strain PLLC

(57) ABSTRACT

A dosing device for outputting bulk goods from a dosing container is described. An exemplary embodiment includes at least one discharge arm, arranged above the bottom of the dosing container so as to be driven about an axis of rotation. The arm supplies bulk goods in the lower section of the dosing container to at least one output opening. The wall in the lower section of the dosing container extends from a cylindrical section above in a truncated cone-shaped manner and encompasses at least a part of the output opening. The output opening extends to the bottom of the dosing container. The at least one discharge arm includes a blade having a distal edge located opposite the axis of rotation, the edge is shaped to correspond to the cone-shaped wall of the dosing container, and a peripheral speed at the edge is below 1 m/s during normal operation.

17 Claims, 7 Drawing Sheets

BULK GOODS DOSING DEVICE

CROSS-REFERENCE TO RELATED PATENT APPLICATIONS

This application is based upon and claims the benefit of priority from prior European Patent Application No. 10 003 341.4, filed Mar. 29, 2010, the entire contents of which are incorporated herein by reference in their entirety.

BACKGROUND OF THE INVENTION

The invention relates to a dosing device for outputting bulk goods, in particular from a storage vessel, such as a bunker or a silo.

In particular in the case of heavy-flowing bulk goods, which are subject to compressions and to the formation of bridges, measures are required for discharging the goods, which comprise the use of a discharge screw, for example. The discharge screw thereby takes over the horizontal transport of the bulk goods out of the silo or the bunker, respectively, and supplies the bulk goods conveyed in this manner to the dosing device. In the dosing device, the material flow takes place in vertical direction, wherein elements, which rotate about a vertical axis and which move the bulk goods in the direction of an output opening on the one hand and keep the bulk goods in a free-flowing manner on the other hand are used, for the most part, for preventing the slow-down of the material flow on the bottom of the dosing container. In case that the bulk goods are potentially explosive dusts, the ATEX guidelines must be considered in response to the design of the dosing vessels.

To prevent the formation of bridges of the bulk goods, from DE 10 261 395 is known the arrangement of a recessed drive front plate for a discharge screw in a dosing vessel, in which ripper teeth are additionally described at the screw blades, by means of which compressed bulk goods can be discharged better.

In the case of known dosing devices, the supply of the bulk goods out of the storage container is carried out horizontally via a conveying screw device and the discharge out of this dosing device takes place by means of actuator arms, which rotate above the container bottom. In these dosing devices, the bulk goods, which arrive from the top, are moved to the outside by means of a guide cone, which is arranged centrally about a drive shaft above the rotating discharge elements, and is supplied to the output openings via said discharge elements. A length of these discharge elements depends on the diameter of the dosing space. In the case of the long discharge elements, the speed of the dosing device required for the discharge leads to a high peripheral speed >1 m/s, whereby additional measures for explosion protection must be taken according to the ATEX guidelines in the case of dusty bulk goods, which can form an explosible atmosphere.

SUMMARY OF PREFERRED EMBODIMENTS

Coming from this state of the art, the present invention is based on the object of creating a more compact dosing device for outputting bulk goods, the vertical drive shaft of which, on which the discharge elements, which rotate on the bottom, are attached, can be operated at the required high speed, without leading to a slow-down in the material flow or to compressions in response to the dosing of the bulk goods. Ignition sources can be avoided effectively by means of a reduced peripheral speed, so that the dosing device is also suitable for discharging dusty bulk goods, which can form explosible atmospheres.

The drive shaft of the dosing device, which is equipped with discharge elements, and the position thereof is to further be better protected against contamination with bulk goods, in particular by means of dusty bulk goods, and thus against a premature wear and destruction.

This object is solved by means of a dosing device comprising the features of claim 1.

Further developments are disclosed in the subclaims.

An embodiment of the invention relates to a dosing device, which is provided for outputting bulk goods. For this purpose, the dosing device encompasses a dosing container, which is arranged vertically about an axis of rotation. In the upper section thereof, which is preferably embodied in a cylindrical manner, the application with the bulk goods is carried out from a bunker or a silo by means of a screw conveying device, which extends out of the bunker/silo and which leads into this upper section of the dosing container. The dosing device further comprises one or a plurality of discharge arms, which are arranged above the dosing container bottom and which can rotate about the axis of rotation by means of a suitable drive, so as to supply the bulk goods to a discharge opening, which can be found in a lower section of the dosing container.

According to the invention, the housing wall of the dosing container is embodied in the lower section, starting at the cylindrical upper section towards the bottom in a truncated cone-shaped manner, so that the cross section of the dosing container tapers considerably. The discharge arm, which is arranged above the bottom, can thus be designed so as to be considerably shorter and can be embodied as a blade, and can encompass an edge, which extends radially away from the axis of rotation towards the wall and which corresponds to the course of the truncated cone-shaped wall. The output opening for conveying the bulk goods downwards is then at least partially located in the truncated cone-shaped wall and extends at least to the bottom.

Principally, the output opening could also extend from the wall into the bottom; it could thus run via the edge between bottom and wall.

The peripheral speed of the discharge arms of below one meter per second can preferably be ensured by means of the wall section, which is tapered in a truncated cone-shaped manner together with the discharge arms, which are embodied in a blade-shaped manner and which are considerably shorter than discharge arms from known devices comprising a constant dosing container cross section, without resulting in slow-downs or compressions in the material flow. The dosing device is further not subject to the ATEX guidelines.

A further embodiment of the dosing device relates to an improvement of the seal of the drive shaft, which provides the rotatory drive of the discharge arms. The drive shaft is arranged in the axis of rotation of the container and extends from underneath the bottom through a passage opening, which is present in the bottom, and further through the bulk goods space to the screw conveying device. Instead of the labyrinth seals and the shaft seals, which are typically used in the case of the known devices between the rotating discharge arms, which are fixedly positioned on the drive shaft, and instead of a flange, which is arranged about the shaft in a stationary manner and which closes the passage opening in the bottom, a slide ring seal is used according to the invention so as to seal the drive shaft against the flange element. The slide ring seal is thereby arranged between the flange element, which is arranged about the drive shaft in a stationary manner underneath a coupling element in the passage opening, and the coupling element, which is provided for coupling the discharge arm/arms to the drive shaft.

In a preferred embodiment, such a coupling element can be designed as sleeve coupling element.

Further embodiments of the dosing device according to the invention relate to a coupling of the drive shaft to a worm shaft of the screw conveyor device via a bevel drive.

The blades, which act as discharge arms, of the device according to the invention can further be embodied in a trapezoidal manner, in particular in the shape of a rectangular trapezoid, in the case of which the edge of the trapezoid, which encompasses the right angle, rests against the drive shaft, while the edge, which faces away from it, points to the wall according to the truncated cone-shaped course.

In the alternative, the embodiment of the blades is also possible as an obtuse-angled L-shaped angle plate, in the case of which a long journal of the "L" forms the edge, which follows the truncated cone-shaped course of the wall.

These and further advantages will be presented by means of the subsequent description with reference to the accompanying figures.

The reference to the figures in the description serves to support the description. Objects or parts of objects, which are substantially the same or similar, can be provided with the same reference numerals. The figures are only schematic illustrations of exemplary embodiments of the invention.

DESCRIPTION OF THE DRAWINGS

FIG. 1 shows a sectional view through a dosing device according to the invention with streams of material flows, which are drawn in.

DETAILED DESCRIPTION OF PREFERRED EMBODIMENTS

On principle, the dosing device according to the invention relates to a device, by means of which bulk goods can be output out of a storage container, such as a silo or a bunker in a metered manner. This can, in particular, also be heavy-flowing bulk goods, which are subject to compressions and to the formation of bridges, and in the case of which a horizontally arranged conveying screw device is used for the even input into the dosing device. In addition, the dosing device is to also be able to dose dusty bulk goods, which are subject to form potentially explosive atmospheres and which thus impose special demands on the devices, which are to fulfill the ATEX guidelines.

Figure 4:
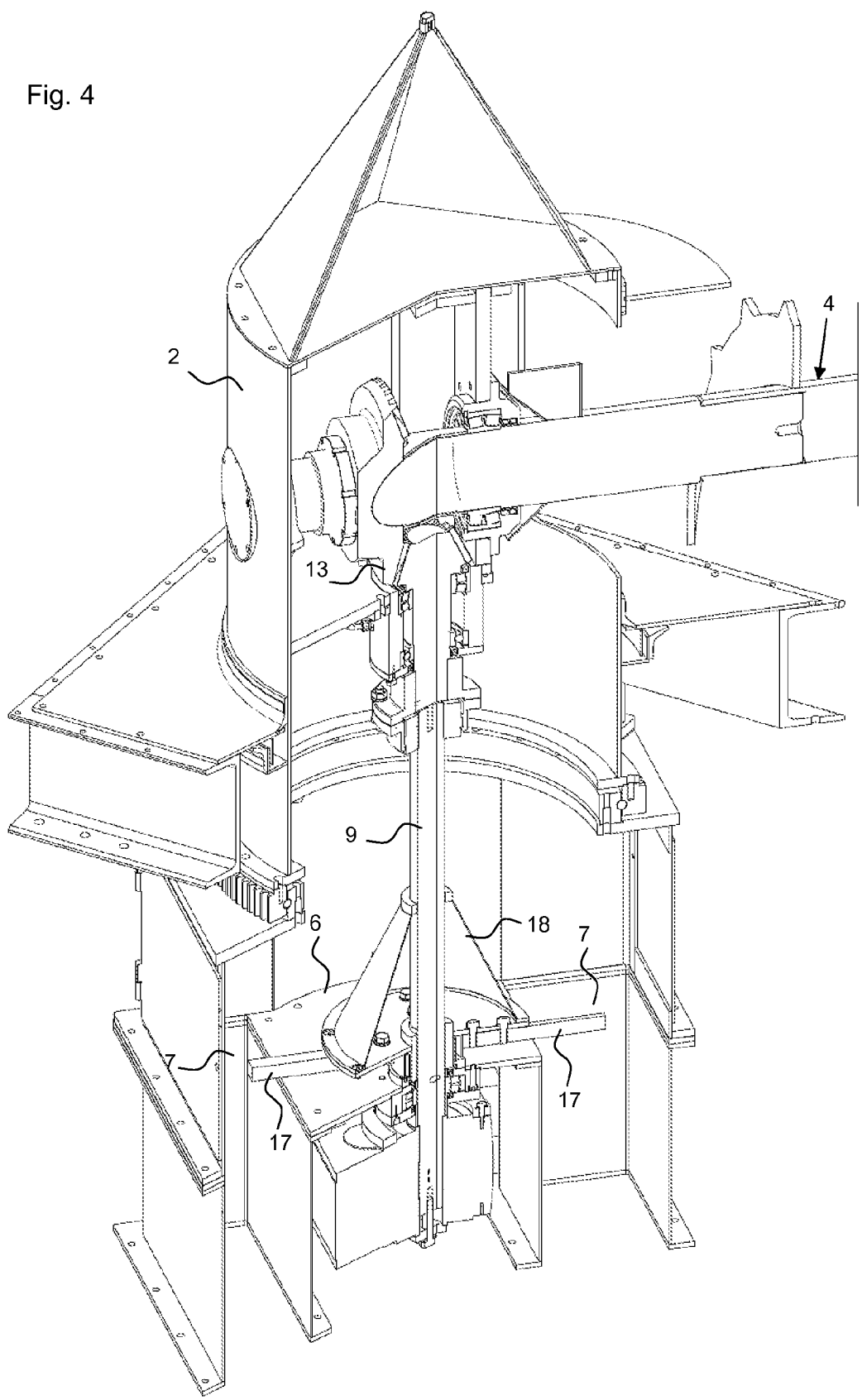
FIG. 4 shows a perspective view of a dosing device according to the state of the art.
Figure 5:
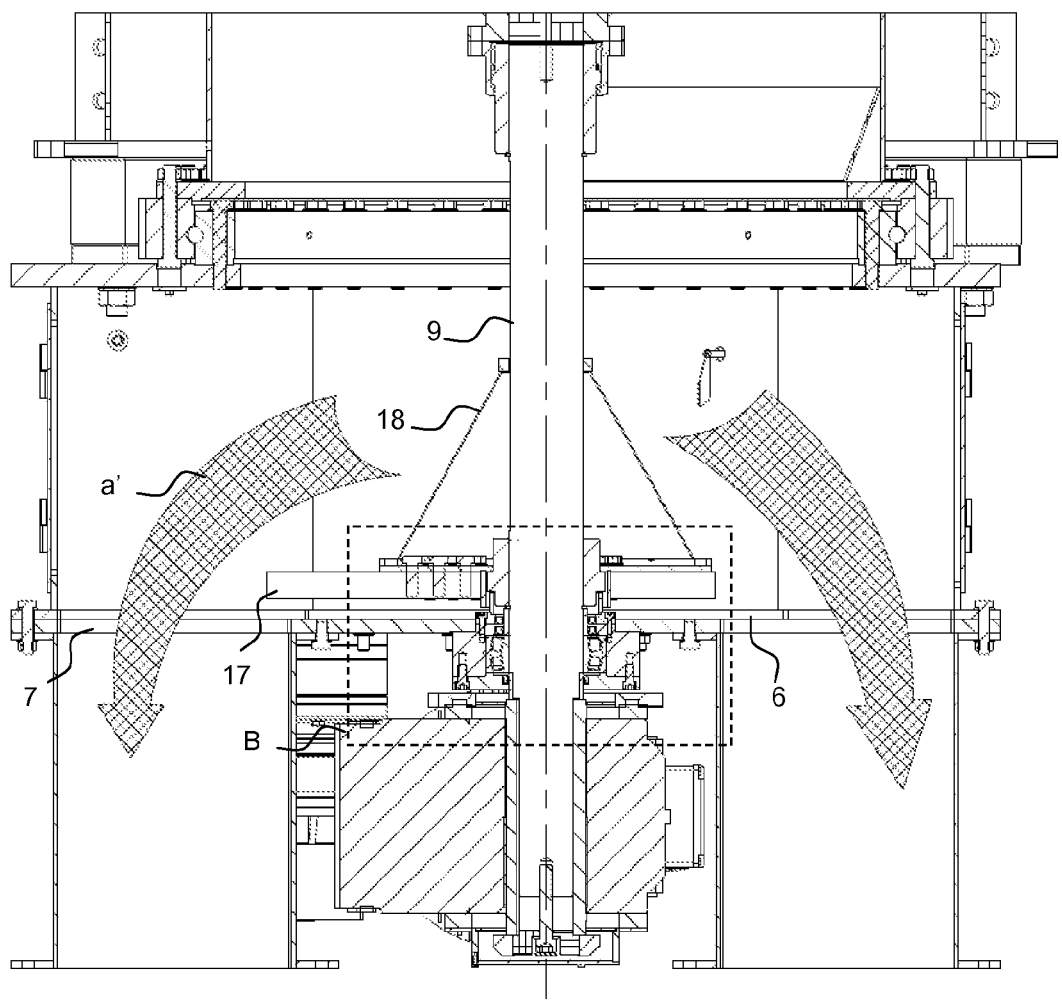
FIG. 5 shows a sectional view of the lower part of the dosing device from FIG. 4 comprising the output material flow.
Figure 6:
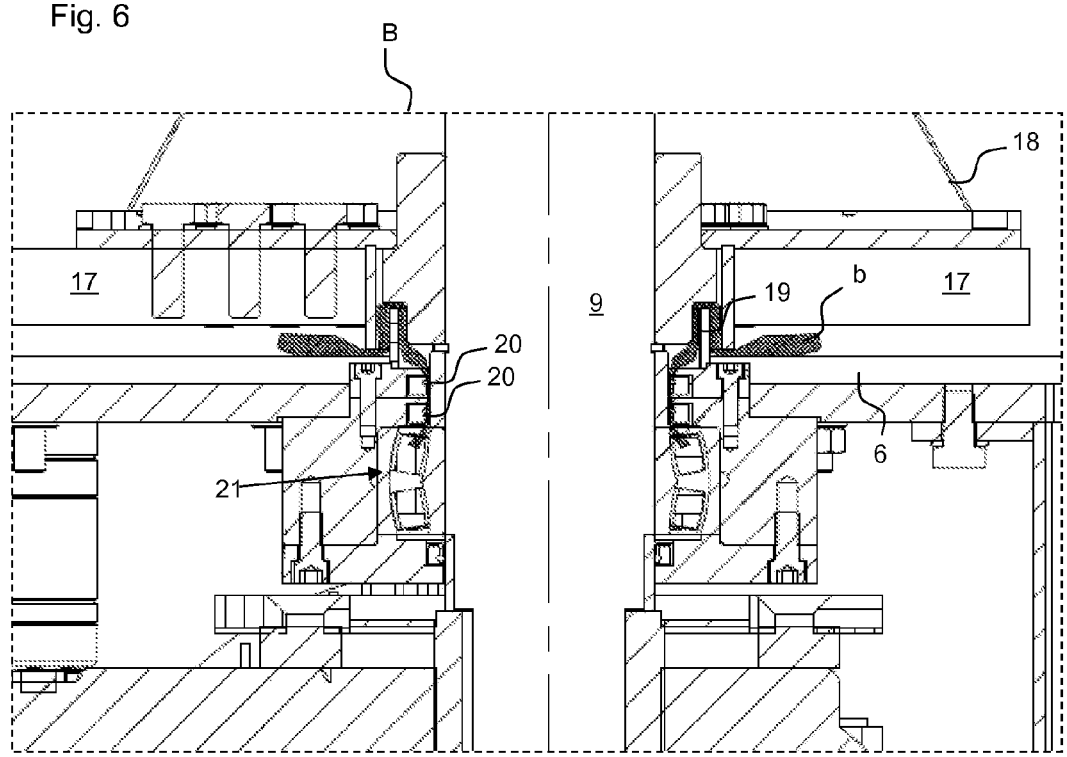
FIG. 6 shows a cross sectional view of the detail B from FIG. 5, which illustrates the shaft seal according to the state of the art.

FIGS. 4 to 6 show a common device according to the state of the art, which is used for such aforementioned purposes. The horizontal conveyor screw device 4, which can be seen in FIG. 4, applies the bulk goods from the respective non-illustrated storage vessel to the dosing device. The discharge out of this dosing device takes place in the lower section of the dosing device, the cross section of which is widened, by means of the actuator arms 17, which rotate above the container bottom 6, which will also be referred to as discharge arms hereinbelow, and which supply the material, which arrives from the top and which is moved to the outside by means of the guide cone 18, to the output openings 7, in that they pick up the material located on the bottom 6 and push it towards the output openings 7.

As can be seen in FIG. 5, the material flow a' thereby runs into the output openings 7 on both sides, after the material has been moved to the outside by the guide cone 18, which is arranged at the drive shaft 9, and has been pushed across the bottom 6 in the direction of the output openings 7 by means of the discharge arms 17.

Figure 1:
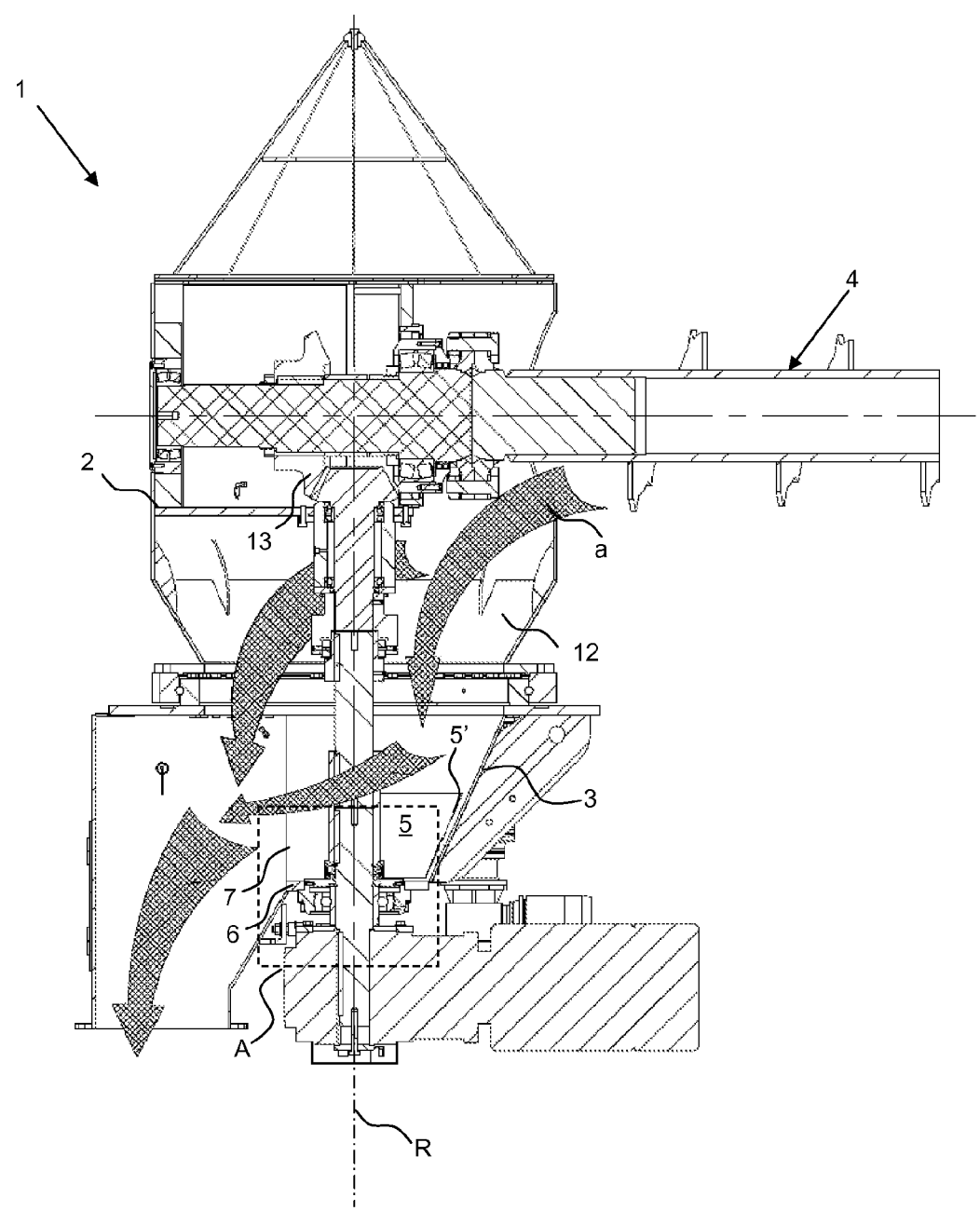

In the upper section 2, the exemplary embodiment of a dosing device 1 according to the invention, which is shown in FIG. 1, resembles the dosing device of the state of the art, in which the material input out of the storage container takes place via the screw conveyor device 4. The material flow also takes place herein vertically downwards, so that the material discharge in the lower section of the dosing device can take place through the output opening 7.

The dosing device 1 according to the invention, however, only encompasses one output opening 7, which, however, is located in the wall section 3, which is tapered in a truncated cone-shaped manner. Due to tapered housing 3, the bulk goods arriving through the material space 12, indicated by means of the arrows a, is thus supplied to the actuator arms or discharge arms 5, respectively, which are embodied as blades, in the instant case as a rectangular trapezoid, according to the invention, and which thus quasi look like a bucket wheel or a vane, respectively. The edge 5' of the blade 5, which points away from the drive shaft 9, which is arranged in the axis of rotation R, runs parallel to the truncated cone-shaped wall 3, so that all of the bulk goods, which flow downwards, are supplied to the output opening 7.

Figure 2:
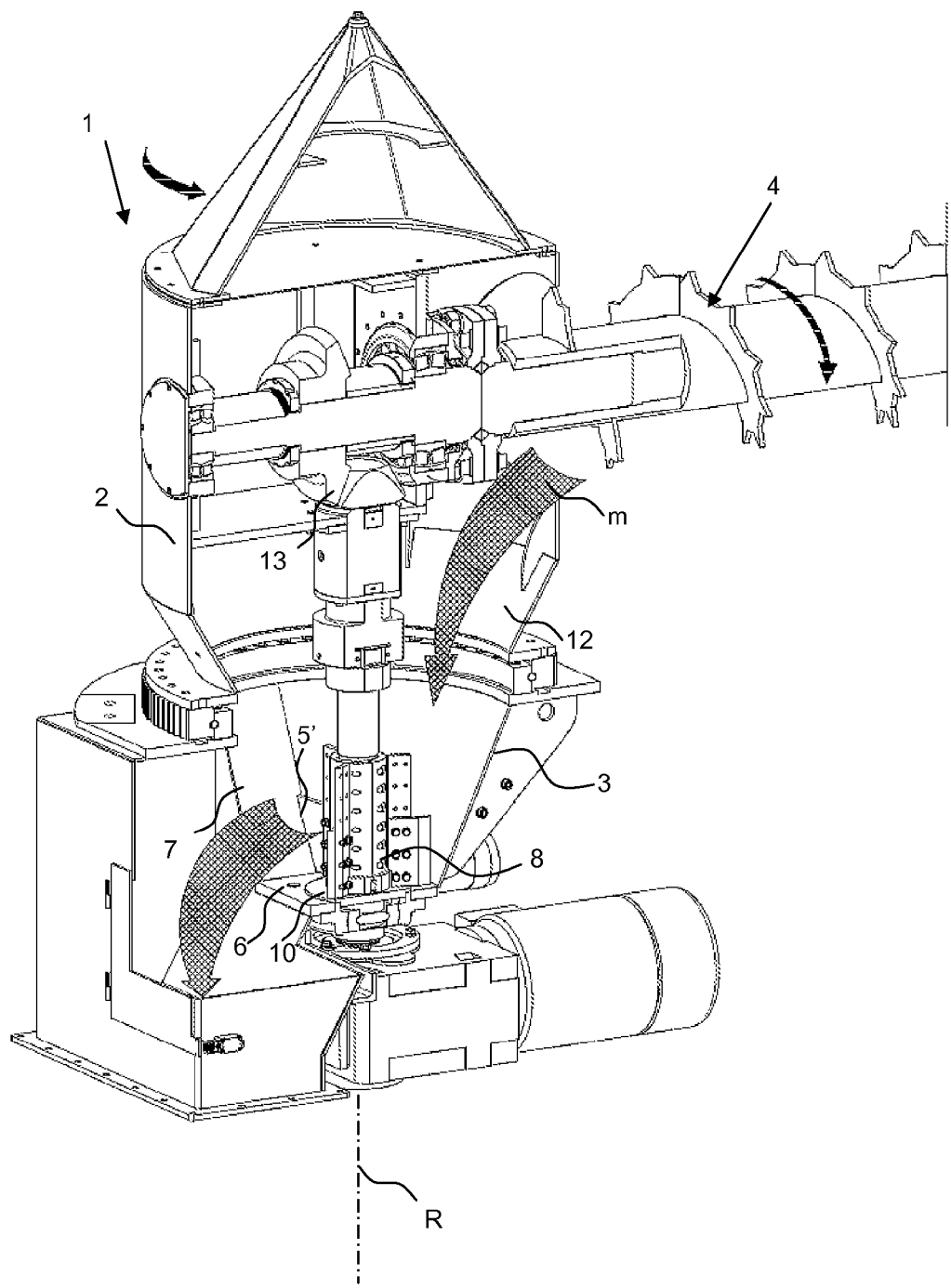
FIG. 2 shows a perspective view of the dosing device from FIG. 1 in a vertical section.

The bulk goods space 12 terminates downwards with the bottom 6 or the flange 10, respectively, which can be seen in FIG. 2. A coupling of the worm shaft to the drive shaft 9 via a bevel drive 13 can be seen in FIGS. 1 and 2.

An attachment of the discharge blade 5 at the drive shaft 9 can take place in a simple manner by means of a sleeve coupling element 8, which can be seen in FIG. 2, the sleeve halves of which can be screwed together in a simple manner.

Figure 3A:
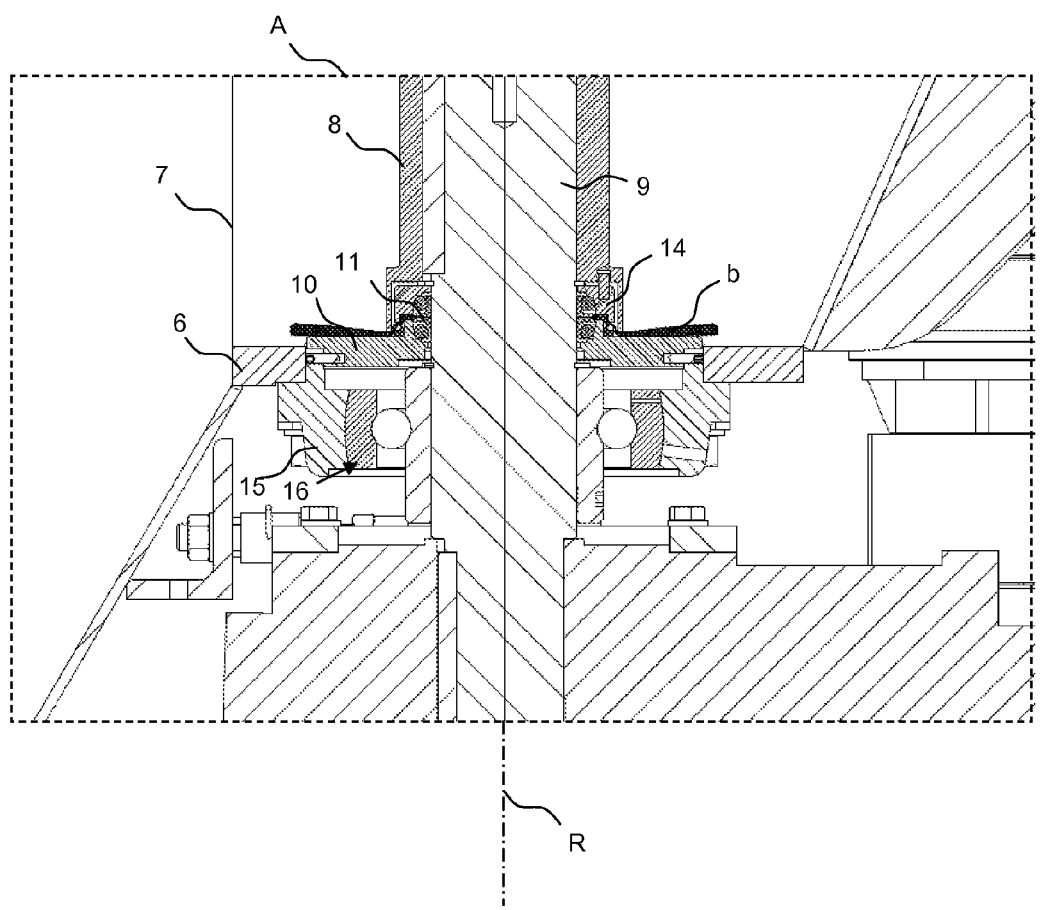
FIG. 3a shows a cross sectional view of the detail A from FIG. 1, which shows the shaft seal.

FIG. 3a shows a detailed illustration of the section A from FIG. 1, in which the improved shaft seal of the instant invention is illustrated. According to the invention, a slide ring seal 11 is used herein, which is also referred to as dynamic seal or shell seal, and which generally takes over the sealing of rotating shafts opposite to a stationary component.

The illustrated extraneous material path b, via which the dusts can enter, is located between the sleeve coupling element 8 and the flange element 10, which is arranged in the shaft passage opening in the bottom 6. The extraneous material path b ends at the slide bearing 11, the surfaces of which, which rest against one another in a planar manner, ensure an excellent seal between rotating and stationary components, when in use. Contrary to a common seal, which is illustrated in FIG. 6 with the enlarged detailed illustration B from FIG. 5, in which the extraneous material finds it way b' through the labyrinth seal past the seal rings 20 into the flange bearing 22, the flange bearing 16 as well as the drive shaft 9 are protected even against permeating dust or extraneous material, respectively, in the seal of the dosing device according to the invention (see FIG. 3a), so that they no longer contaminate and are subject to a smaller wear. Through this, the amount of maintenance is also reduced.

One of the two spring mounted slide rings of the shell seal 11 is located on the shaft 9 so as to rotate by means of a support ring 14, which is screwed to the sleeve coupling element 8, while the second counter slide ring, which is also spring mounted, rests in the flange element 10 in a stationary manner, but also against the shaft.

The flange bearing 16 is present in a housing section 15, which is connected to the bottom 6 and to the flange element 10.

Figure 3B:
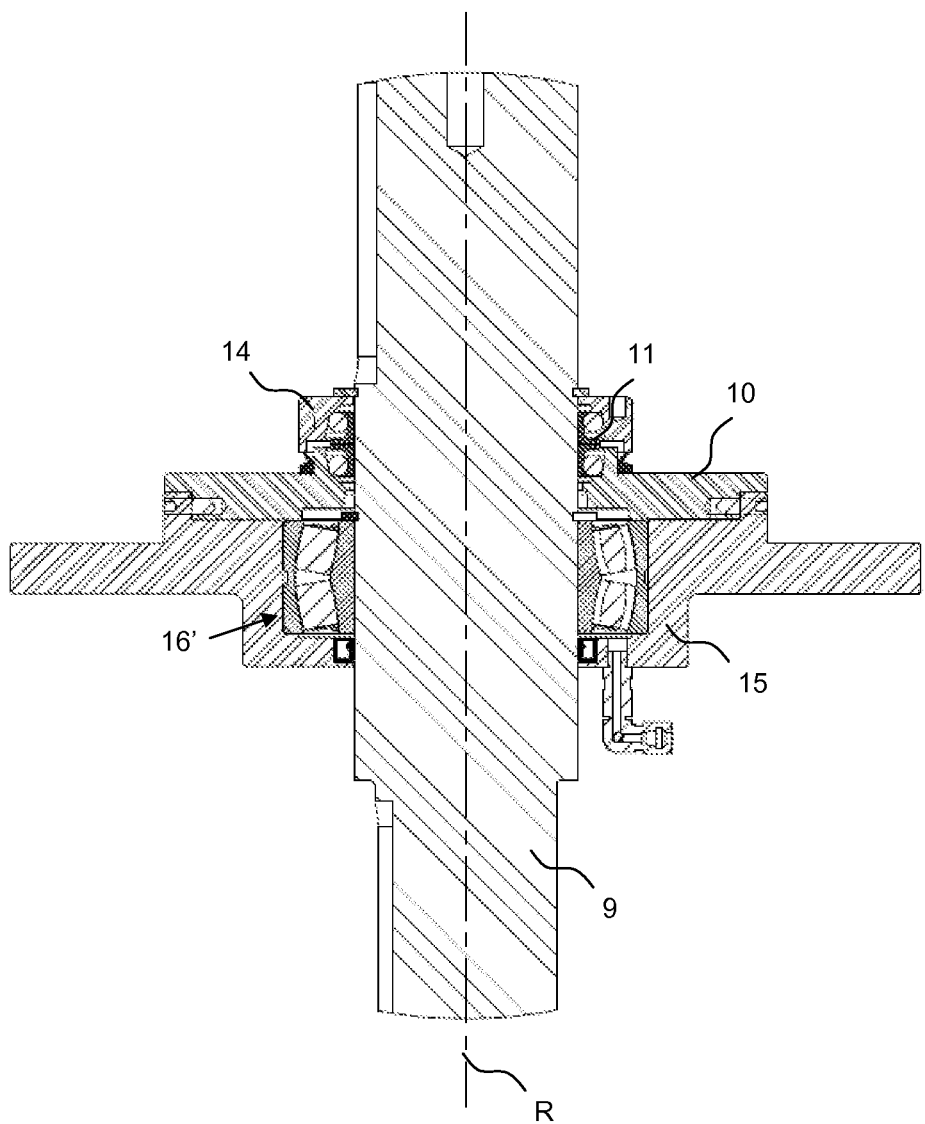
FIG. 3b shows a cross sectional view of an alternative shaft seal according to an embodiment according to the invention.

Instead of the flange bearing, a spherical roller bearing 16', which can be used as an alternative, can be seen in FIG. 3b.

It can additionally be seen from FIG. 3a that the bottom 6 is slightly undercut on the side of the output opening 7, so that the discharge is facilitated or improved, respectively.

The disclosed dosing device according to the invention provides for a reduced peripheral speed of below one meter per second due to the truncated cone-shaped housing and thus due to the shortened actuator arms, so that special measures for protection against explosion must not be taken, and a slow-down of the material flow is prevented nonetheless.

The amount of maintenance and maintenance intervals are further decreased or increased, respectively, by means of the use of a shell or slide ring seal, in that extraneous material or dust, respectively, can no longer reach the shaft as well as the bearing.

| | List of Reference Numerals |
|---|---|
| 1 | Dosing device |
| 2 | Upper container section |
| 3 | Truncated cone-shaped wall of the lower container section |
| 4 | Screw conveyor device |
| 5, 5' | Blade discharge arm, edge at the wall |
| 6 | Bottom |
| 7 | Output opening |
| 8 | Sleeve coupling element |
| 9 | Drive shaft |
| 10 | Flange |
| 11 | Slide ring seal |
| 12 | Bulk goods space |
| 13 | Bevel drive |
| 14 | Support ring |
| 15 | Bearing housing |
| 16, 16' | Flange bearing, spherical roller bearing |
| 17 | Discharge arm |
| 18 | Guide cone |
| 19 | Labyrinth seal |
| 20 | Seal ring |
| 21 | Bearing |
| a, a' | Material flow |
| b | Extraneous matter path |

The invention claimed is:

1. A dosing device for outputting bulk goods comprising:
an upper cylindrical section into which a bulk goods screw conveyor device leads,
a dosing container arranged vertically about an axis of rotation (R),
an output opening, and
a discharge arm arranged above a bottom of the dosing container so as to be driven about the axis of rotation (R) in a rotatory manner so as to supply bulk goods in a lower section of the dosing container to the output opening, wherein
the wall in the lower section of the dosing container is a cone-shaped wall embodied in a truncated cone-shaped manner from the cylindrical section towards the bottom and encompasses at least a part of the output opening, wherein the output opening extends at least to the bottom of the dosing container, and
the discharge arm comprises a blade comprising a distal edge located radially away from the axis of rotation (R), wherein the edge is shaped to correspond to the cone-shaped wall,
wherein a peripheral speed of the discharge arm is below 1 m/s.

2. The device according to claim 1,
wherein the discharge arm is driven in a rotatory manner by means of a drive shaft arranged in the axis of rotation (R), which extends from underneath the bottom of the dosing container, through a bulk goods space, and to the bulk goods screw conveyor device, wherein the drive shaft passes through a passage opening present in the bottom of the dosing container,
wherein
the discharge arm is coupled to the drive shaft by means of a coupling element, and
a flange element is arranged about the drive shaft in a stationary manner underneath the coupling element in the passage opening, and
the drive shaft is sealed against the flange element by means of a slide ring seal, which is arranged on the drive shaft between the coupling element and the flange element.

3. The device according to claim 2,
wherein the drive shaft and a worm shaft of the bulk goods screw conveyor device are coupled via a bevel drive.

4. The device according to claim 3, wherein the output opening extends from the wall into the bottom.

5. The device according to claim 3, wherein
the blade is embodied as a trapezoid, or
the blade is embodied as an obtuse-angled L-shaped angle plate, wherein the long journal of the "L" forms the edge, wherein the long journal of the "L" is shaped to correspond to the cone-shaped wall.

6. The device according to claim 5, wherein the trapezoid is a right trapezoid.

7. The device according to claim 2, wherein the output opening extends from the wall into the bottom.

8. The device according to claim 2, wherein
the blade is embodied as a trapezoid, or
the blade is embodied as an obtuse-angled L-shaped angle plate, wherein the long journal of the "L" forms the edge, wherein the long journal of the "L" is shaped to correspond to the cone-shaped wall.

9. The device according to claim 8, wherein the trapezoid is a right trapezoid.

10. The device according to claim 2, wherein the coupling element comprises a sleeve coupling element.

11. The device according to claim 1,
wherein the output opening extends from the wall into the bottom.

12. The device according to claim 11, wherein
the blade is embodied as a trapezoid, or
the blade is embodied as an obtuse-angled L-shaped angle plate, wherein the long journal of the "L" forms the edge, wherein the long journal of the "L" is shaped to correspond to the cone-shaped wall.

13. The device according to claim 12, wherein the trapezoid is a right trapezoid.

14. The device according to claim 1, wherein
the blade is embodied as a trapezoid, or
the blade is embodied as an obtuse-angled L-shaped angle plate, wherein the long journal of the "L" forms the edge, wherein the long journal of the "L" is shaped to correspond to the cone-shaped wall.

15. The device according to claim 14, wherein the trapezoid is a right trapezoid.

16. The device according to claim 1, wherein the peripheral speed of the discharge arm is below 1 m/s during all operation.

17. The device according to claim 1, wherein the output opening extends at least to the top of the truncated cone-shaped portion of the dosing container.

* * * * *